United States Patent

Mizandjian et al.

[11] Patent Number: 4,766,001
[45] Date of Patent: Aug. 23, 1988

[54] PROCESS FOR TREATING A FOOD LIQUID WITH A GAS

[75] Inventors: Jean-Luc Mizandjian, Igny; Jean-Marc Meyer; Jean Amen, both of Versailles, all of France

[73] Assignee: L'Air Liquide, Societe Anonyme pour l'Etude et l'Exploitation des Procedes Georges Claude, Paris, France

[21] Appl. No.: 36,549

[22] Filed: Apr. 8, 1987

[30] Foreign Application Priority Data

Apr. 15, 1986 [FR] France ............................. 86 05341

[51] Int. Cl.⁴ .............................................. B01F 3/04
[52] U.S. Cl. ..................................... 426/477; 426/475; 426/487; 261/DIG. 7; 261/DIG. 75; 261/36.1
[58] Field of Search ............... 261/DIG. 75, DIG. 7, 261/36.1; 426/475, 477, 478

[56] References Cited

U.S. PATENT DOCUMENTS

| | | | |
|---|---|---|---|
| 1,526,179 | 2/1925 | Parr et al. | 261/DIG. 75 |
| 2,388,753 | 11/1945 | Mallmann et al. | 261/DIG. 75 |
| 2,413,102 | 12/1946 | Ebert et al. | 261/DIG. 75 |
| 3,400,818 | 9/1968 | Tarjan | 261/DIG. 75 |
| 3,710,549 | 1/1973 | Nichols et al. | 261/DIG. 75 |
| 3,780,198 | 12/1973 | Pahl et al. | 426/477 |
| 3,809,240 | 5/1974 | Savall | 261/DIG. 75 |
| 3,877,358 | 4/1975 | Karr | 426/477 |
| 3,954,921 | 5/1976 | Yoshida et al. | 261/DIG. 75 |
| 3,997,631 | 12/1976 | Matsuoka et al. | 261/DIG. 75 |
| 4,019,720 | 4/1977 | Levesgne et al. | 261/DIG. 75 |
| 4,191,784 | 3/1980 | Mojonnier et al. | 426/487 |
| 4,210,534 | 7/1980 | Molvar | 261/DIG. 75 |
| 4,259,360 | 3/1981 | Venetucci et al. | 426/487 |
| 4,328,107 | 5/1982 | Wright | 261/DIG. 75 |
| 4,352,679 | 10/1982 | Notardonato et al. | 426/477 |
| 4,447,157 | 5/1984 | Underwood | 366/137 |
| 4,639,340 | 1/1987 | Garrett | 261/DIG. 75 |

FOREIGN PATENT DOCUMENTS

| | | |
|---|---|---|
| 1557197 | 3/1970 | Fed. Rep. of Germany . |
| 2644378 | 4/1978 | Fed. Rep. of Germany . |
| 3334824 | 4/1985 | Fed. Rep. of Germany . |
| 778202 | 3/1935 | France . |
| 799184 | 6/1936 | France . |
| 971536 | 1/1951 | France . |
| 2509996 | 1/1983 | France . |
| 1156417 | 6/1969 | United Kingdom . |
| 1274195 | 5/1972 | United Kingdom . |

Primary Examiner—Tim Miles
Attorney, Agent, or Firm—Young & Thompson

[57] ABSTRACT

A process for deoxygenating or carbonating a food or biological liquid product having an initial dissolved oxygen concentration between 9 mg/l and 12 mg/l, comprising injecting at least one gas selected from the group consisting of nitrogen and carbon dioxide into a current of the food or biological liquid product thereby to form a gas/liquid emulsion. The emulsion is introduced into a storage vessel. The gas is at a pressure of about 3 bars. The gas and liquid are injected into a confined mixing chamber at a volume rate of gas to liquid between 3 and 5, and expelled the chamber at a velocity of 15 to 30 meters per second into the vessel above the bottom of the vessel a distance which is a minor proportion of the height of the vessel, until the residual dissolved oxygen content is less than 0.25 mg/l.

2 Claims, 3 Drawing Sheets

PROCESS FOR TREATING A FOOD LIQUID WITH A GAS

The present invention relates to the treatment of a food or biological liquid with a gas for the purpose of modifying concentrations and natures of the gases dissolved in a food liquid of the type in which there is injected a substitution or addition gas into a current of said food liquid leading to a storage vessel constituting a debubbling vessel.

In known agricultural food and biological treatment processes employing liquid or viscous products, it is sometimes necessary to determine in a precise manner the content of oxygen dissolved in order to avoid, by excess oxygen, alterations of these products. In some cases, it is necessary to reach a very low dissolved oxygen content of between 0.25 mg/l and 0 mg/l and various techniques enable this to be achieved, namely:

- a mechanical technique employing a high vacuum which is however complex to carry out and involves a high investment cost;
- a thermal technique which is ill adapted to the treatment of food products sensitive to heat and whose operating cost is high owing to its consumption of energy;
- a technique employing an inert gas such as nitrogen or carbon dioxide transferred into the liquid by conventional diffusers to "displace" the dissolved oxygen which are of a low investment and operating cost but whose performances remain limited, in particular when it is desired to use them for continuous treatments.

It has also been proposed to effect said substitution by the preparation of an emulsion of the treatment gas and the food or biological product by the simultaneous and continuous injection of a current of gas and a jet of liquid product into a confined mixing chamber from which said emulsified liquid thus formed escapes and is conveyed to a reserve of liquid product in the storage-debubbling vessel, but in this case, the emulsion is poured above a reserve of liquid so that the substitution operation is carried out slowly and incompletely.

The problem at the origin of the present invention was particularly and precisely to define a quasi-complete technique for the deoxygenation of food and biological liquids (intended concentration of between 0 and 0.25 mg/l of dissolved oxygen) starting with a liquid having a concentration of dissolved oxygen which may reach 12 mg/l by employing an inert gas (N2, CO2 or an N2—CO2 mixture) which is capable of attaining the intended object both in discontinuous operation or in semi-continuous operation which is simple, and therefore of low investment and maintenance cost, and cheap to operate.

These objects are attained according to the invention in that the emulsified liquid is injected into the reserve at a short distance from the bottom of the latter.

A device for carrying out this process comprises a chamber having a first inlet passage for delivering a jet of liquid product and a second inlet passage for delivering a current of gas under pressure, and an ejection passage for connection to a storage-debubbling vessel.

The system employing the double injection into a chamber results in an effective gas-liquid transfer by the creation of a strong emulsion; the vessel ensures the maintenance of this emulsion, improves the gas or reactor transfer and permits the desired treatment, for example the elimination of the oxygen.

One of the advantages of the invention resides in the simplicity of the equipment since:

- on the one hand, the gas inlet conduit is located outside the storage vessel,
- on the other hand, the mixing chamber is simply placed in the liquid pipe and preferably leads to the bottom of the vessel,
- the storage vessel performs the function of a debubbling vessel,
- lastly, a simple injection pump for the liquid forms the liquid jet.

In this way, an emulsion of gaseous bubbles is formed in the liquid and a constant gas injection flow is maintained.

The liquid-gas emulsion issuing from the ejection passage is maintained inside the vessel; preferably, a rotation of the liquid propelled inside the vessel, caused by a tangential disposition of the ejector with respect to a cylindrical lateral wall of the vessel, enables the gas-liquid contact time to be increased which effectively ensures the last transfer step before debubbling.

The treatment process may be carried out in accordance with industrial manufacturing requirements:

- either in a continuous treatment: the liquid is treated in a single passage in the mixing chamber and the vessel;
- or in a discontinuous treatment: the liquid is treated in "batches", a recycling pump ensuring a perfect mixture of the liquid in the vessel or reactor;
- or in a semi-continuous treatment: a part of the liquid withdrawn is reinjected to permit a correct stirring of the reactor.

In these procedures, a vertical vessel is preferably employed whose height is three times the diameter, the mixing chamber having the ejection passage is advantageously mounted on the reactor above the withdrawal point and at a height preferably equal to one fifth of the height of the reactor relative to the bottom of the vessel. An orientation of the ejection passage of between 0° and 60° downwardly relative to the horizontal avoids the coalescence of the bubbles.

A recycling of the gaseous phase rich in gas to be injected into the transfer apparatus is sometimes advantageous and a plurality of devices having a mixing chamber may be employed. The reactor is, if necessary, put under pressure to ensure a saturation of the liquid beyond atmospheric pressure.

The features and advantages of the invention will be apparent from the following description which is given by way of example with reference to the accompanying drawings, in which.

Figure 1:
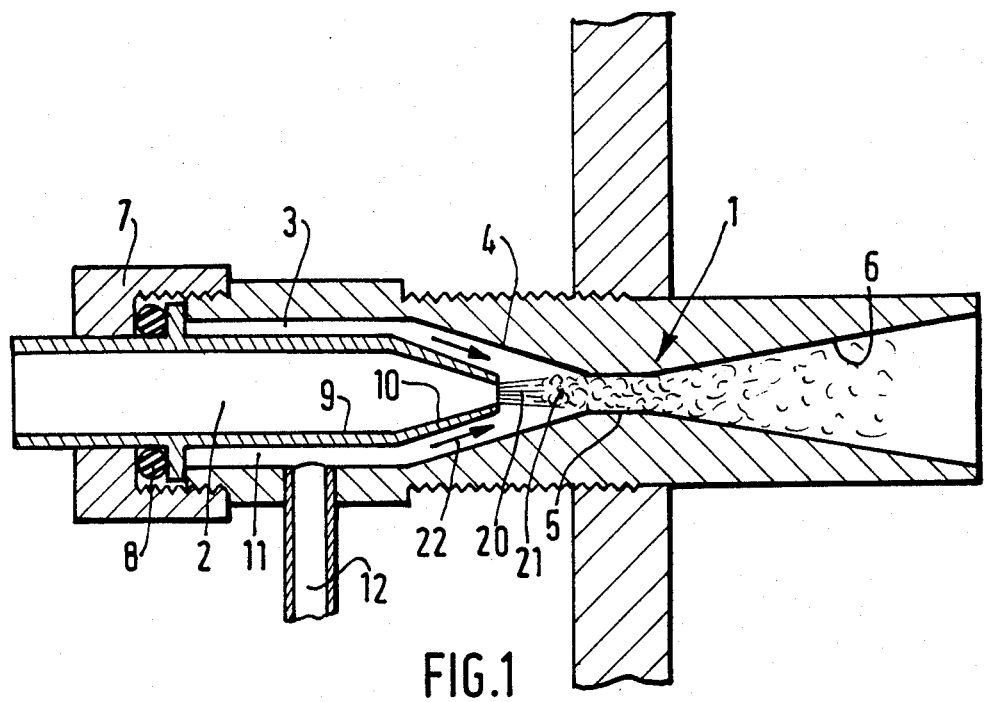
FIG. 1 is a sectional view of a mixing device for practicing a method according to the invention.

With reference to FIG. 1, the mixing device comprises:

A generally cylindrical element 1 with an axial passage 2 having from left to right in the drawing, i.e. in the direction of the flow of the fluids:

- a mixing chamber formed by a cylindrical part 3 followed by a convergent frustoconical part 4,
- an ejection passage 5 or transfer cylinder,
- a diffuser cone 6 whose divergent part permits the injection of the gas/liquid mixture into the storage-debubbling vessel;

An element 9 or liquid injection nozzle formed at its upstream end by a cylindrical part connected to a source of food or biological liquid product and terminating in a frustoconical outlet 10. The element 9 forms, with the cylindrical part 3, an annular passage 11 into which opens a transverse conduit 12 supplying gas under pressure. The distance between the injection nozzle 9 and the ejection passage 5 is greater than or equal to three times the length of said ejection passage 5.

A member 7 or nut interconnecting the elements 1 and 9 through a joint 8.

If desired, the gas may be made to undergo a rotating movement in the mixing chamber, for example by disposing the conduit 12 tangentially relative to the part 3 of this chamber.

In operation, a food or biological liquid product is introduced under pressure into the nozzle 9 so as to form, as it leaves the nozzle, a liquid jet 20 having a speed of 15 to 30 m/sec and preferably 20 m/sec. The liquid jet thus produced reaches the mixing chamber 21 and meets the gaseous current under pressure 22 entering through the conduit 12.

The gas/liquid material transfer is then ensured:
in the mixing chamber 21 by the creation of a gas/liquid emulsion having a large interface area;
in the ejection conduit 5 permitting a homogeneous flow at a speed of 15 to 30 m/sec and preferably 20 m/sec;
in the diffusion cone 6 maintaining the created emulsion and limiting the coalescence of the bubbles before entering the storage-debubbling vessel.

A few manners of proceeding will now be described.

Figure 2:
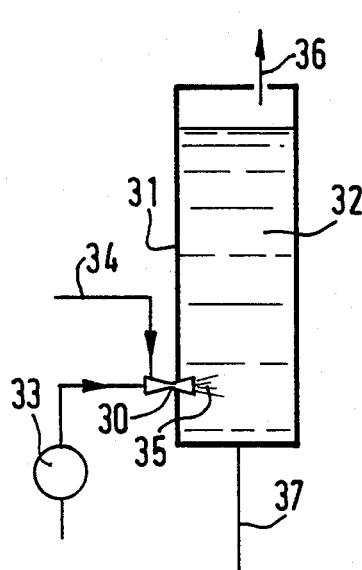
FIGS. 2 to 8 are diagrammatic views of a few manners of proceeding.

In FIG. 2, a mixing device 30, such as that described before, is mounted to extend through a lateral wall 31 of a storage vessel 32 at a short distance from the bottom in order to permit a correct debubbling. The liquid is here transferred from a source (not shown) by a pump 33, while the gas is transferred through a conduit 34. The emulsified liquid issuing from the mixing device 30 is introduced in the form of a divergent jet 35. The gas bubbles resulting from the treatment escape at 36 and the treated liquid is withdrawn at 37. It is therefore a continuous operation.

Figure 3:
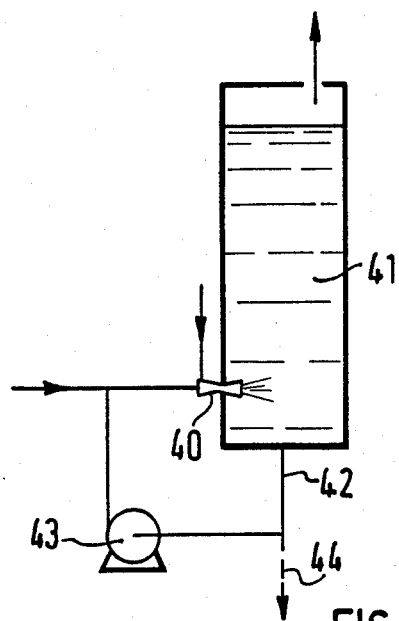

In FIG. 3, the mixing device 40 is supplied with liquid in such manner as to progressively fill a vessel 41; liquid is withdrawn from the bottom 42 and is recycled to the inlet of the mixing device 40 by a pump 43. This is a batchwise operation. Treated liquid is withdrawn at 44 from time to time.

Figure 4:
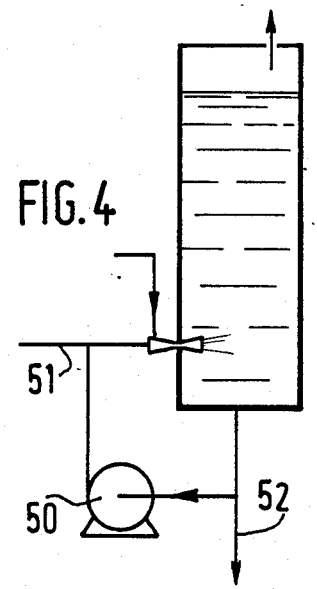

In FIG. 4, liquid is recycled again by a pump 50 to ensure a correct stirring but liquid to be treated is supplied at 51 and the treated liquid is withdrawn continuously at 52. This is a semi-continuous treatment.

Figure 5:
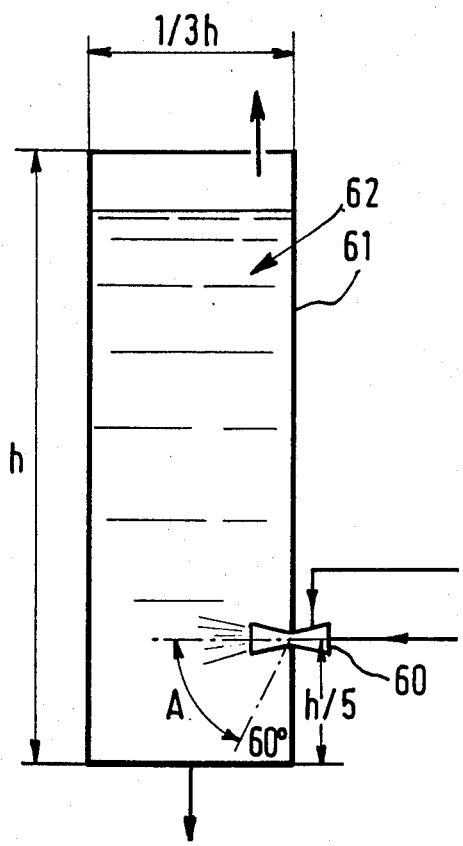
Figure 6:
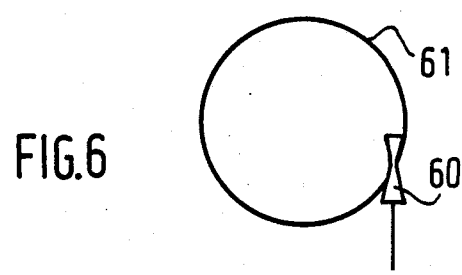

FIGS. 5 and 6 show a plant of the type described with reference to FIG. 2, but in this case the axis of the mixing device 60 is oriented substantially tangentially to the cylindrical wall of the vessel 61 so as to create a circular stirring movement in the direction of arrow F. Diamensionally, the vessel 62 has a diameter on the order of ⅓ of its height h. The axis of the mixing device is horizontal or oriented downwardly at an angle A which may be as much as 60°.

Figure 7:
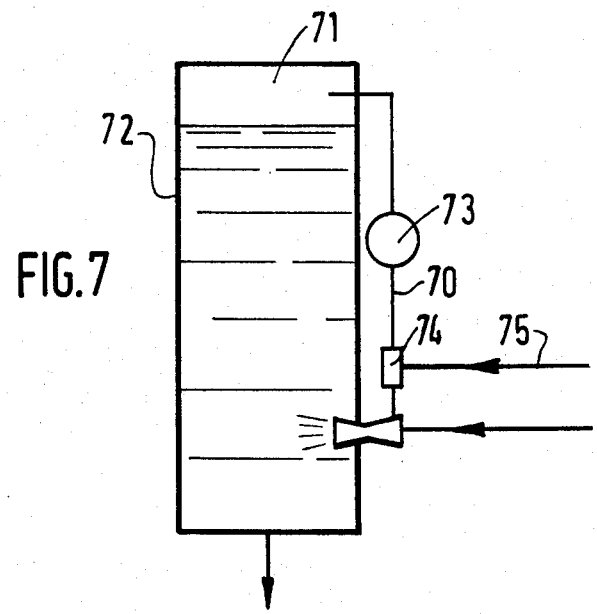
Figure 8:
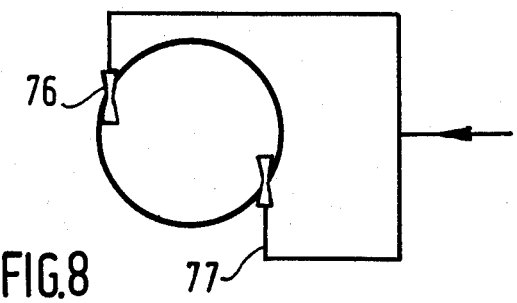

In FIGS. 7 and 8, a pipe 70 is provided for recycling the gas, this pipe conducting a gaseous phase 71 in a closed vessel 72 through a blower 73 to a connection 74 for introducing gas providing a combined entry of recycling gas and a treatment gas 75.

FIG. 8 shows two mixing devices 76 and 77 disposed tangentially in the vessel for accentuating the stirring movement.

A few results of the process of the invention will now be given by way of examples.

1. Deoxygenation of water with nitrogen in a closed circuit;

| volume of the vessel or reactor | height | diameter |
|---|---|---|
| 0.4 cu m | 1.80 m | 0.6 m |

Liquid to be treated:
water
liquid flow=2 cu m/hr
dissolved oxygen=9 mg/l
Gas: N2
gas flow=4 cu m/hr 'Ap mixer=3 bars
Treated liquid
treatment time=10 min
dissolved oxygen=0.05 mg/l 2. Deoxygenation-carbonation of water with CO2 in a closed circuit at atmospheric pressure
Vol. reactor=0.4 cu m (h=1.80 m. d=0.6 m)
Liquid to be treated:
water
flow $H_2O$=2 cu m/hr
dissolved ($O_2$)=9.5 mg/l
Gas: $CO_2$
gas flow: 6 cu m/hr
Ap mixer=3 bars
Treated liquid
(treatment time)=14 min
dissolved ($O_2$)=0.06 mg/l
dissolved ($CO_2$)=1.95 g/l
pH=5.3

3. Deoxygenation of water with nitrogen in an open circuit
Reactor=10 cu m (H=1.6 m, d=3 m)
Liquid to be treated
water
liquid flow=8 cu m/hr
dissolved ($O_2$)=9.5 mg/l
Gas
N2
gas flow=40 cu m/hr
Ap ejector=3 bars
Treated liquid
dissolved ($O_2$)=0.23 mg/l The proposed technique is adapted to the oxygenation of liquids and concerns, irrespective of the gas employed, not only the agricultural food and biological industries, but also other industrial fields. Its object is either to replace a dissolved gas by another gas or to add a gas such as $CO_2$.

What is claimed is:

1. A process for deoxygenating or carbonating a food or biological liquid product having an initial dissolved oxygen concentration between 9 mg/l and 12 mg/l, comprising injecting at least one gas selected from the group consisting of nitrogen and carbon dioxide into a current of said food or biological liquid product thereby to form a gas/liquid emulsion, and introducing said emulsion into a storage vessel, said gas being at a pressure of about 3 bars, said gas and liquid being injected into a confined mixing chamber at a volume rate of gas to liquid between 3 and 5 to form said emulsion, said emulsion being expelled from said chamber at a velocity of 15 to 30 meters per second into said vessel above the bottom of the vessel a distance which is a minor proportion of the height of the vessel until the residual dissolved oxygen content is less than 0.25 mg/l.

2. A process as claimed in claim 1, in which said vessel is free from baffles.

* * * * *